United States Patent [19]
Jones et al.

[11] Patent Number: 5,391,330
[45] Date of Patent: Feb. 21, 1995

[54] PROCESS FOR PREPARING NAPHTHALENEDICARBOXYLIC ACID CONTAINING POLYMER BLENDS HAVING REDUCED FLUORESCENCE

[75] Inventors: Allan S. Jones, Church Hill; David E. Mills, Kingsport, both of Tenn.

[73] Assignee: Eastman Chemical Company, Kingsport, Tenn.

[21] Appl. No.: 238,771

[22] Filed: May 5, 1994

Related U.S. Application Data

[63] Continuation-in-part of Ser. No. 103,646, Aug. 9, 1993.

[51] Int. Cl.$^6$ .............................................. C09K 11/00
[52] U.S. Cl. ....................... 264/21; 528/272; 528/298; 528/299; 528/302; 528/305; 528/308; 525/437; 264/239; 264/240
[58] Field of Search ............ 528/272, 298, 299, 302, 528/305, 308; 525/437; 264/21, 239, 240

[56] References Cited

U.S. PATENT DOCUMENTS 4,101,528   7/1978   Knopka .......................... 524/409

OTHER PUBLICATIONS

CA 116(6):42677v.
CA 86(24):172389a.
CA 84(24):166120y.
CA 84(6):32474h.
CA 83(20):165176p.

*Primary Examiner*—Samuel A. Acquah
*Attorney, Agent, or Firm*—John D. Thallemer

[57] ABSTRACT

This invention relates to naphthalenedicarboxylic acid containing polymer compositions having reduced fluorescence. More specifically, the process involves melt blending a naphthalenedicarboxylic acid containing polymer with 0.1 to 5 weight percent of a fluorescence quenching compound selected from a halogen containing aromatic compound, an aromatic ketone or a naphthol compound and thermoforming the blend into an article. The blends are useful for packaging applications where clarity and/or aesthetic appeal are of concern.

7 Claims, No Drawings

PROCESS FOR PREPARING NAPHTHALENEDICARBOXYLIC ACID CONTAINING POLYMER BLENDS HAVING REDUCED FLUORESCENCE

CROSS REFERENCE TO RELATED APPLICATIONS

This application is a continuation-in-part of application Ser. No. 08/103,646, filed Aug. 9, 1993.

FIELD OF THE INVENTION

This invention relates to naphthalenedicarboxylic acid containing polymer compositions having reduced fluorescence. More specifically, the process involves melt blending a naphthalenedicarboxylic acid containing polymer with 0.1 to 5 weight percent of a fluorescence quenching compound selected from a halogen containing aromatic compound, an aromatic ketone or a naphthol compound and thermoforming the blend into an article. The blends are useful for packaging applications where clarity and/or aesthetic appeal are of concern.

BACKGROUND OF THE INVENTION

Naphthalenedicarboxylic acid is used to make extrusion and injection-molding resins because of the good heat resistance, high glass transition temperature, and gas barrier properties of naphthalenedicarboxylic acid based polymers. Polymers containing naphthalenedicarboxylic acid are used in the fabrication of various articles for household or industrial use, including appliance parts, containers, and auto parts. One major drawback of naphthalenedicarboxylic acid containing polymers, however, is their inherent bluish fluorescence. Thus, objects prepared with naphthalenedicarboxylic acid containing polymers have a hazy and bluish appearance. This phenomenon is especially of concern in the packaging of foods and beverages wherein the food or beverage inside a container made from a naphthalenedicarboxylic acid containing polymer appears unnatural.

The fluorescence of homopolymers of poly(ethylene 2,6-naphthalenedicarboxylate), referred to as PEN, is known in the art. Because of the improved properties of naphthalenedicarboxylic acid containing polymers, it is desirable to incorporate small amounts of naphthalenedicarboxylic acid in polymers such as poly(ethylene terephthalate) (PET). However, copolymers containing very small amounts of naphthalenedicarboxylic acid fluoresce with intensity similar to, or in some cases greater than PEN homopolymers. Surprisingly, poly(ethylene terephthalate) modified by copolymerizing in less than 1 mole percent naphthalenedicarboxylic acid has significant visible fluorescence.

Fluorescence is a type of luminescence in which an atom or molecule emits radiation in passing from a higher to a lower electronic state. The term is restricted to phenomena in which the time interval between absorption and emission of energy is extremely short ($10^{-10}$ to $10^{-6}$ second). Fluorescence in a polymer or small molecule, occurs when a photon is emitted from an excited singlet state. Quenching of fluorescence eliminates or reduces the ability for photon emission by providing an alternative pathway for the excited state energy such as vibronic or heat loss, or intersystem crossing to the excited triplet state.

Methods to quench fluorescence in PEN have been disclosed by Chen Shangxian et al. in an article entitled, "Fluorescence Spectra of Poly(Ethylene-2,6-Naphthalene Dicarboxylate)" which appeared in *SCIENTIA SINICA*, Vol. XXIV, No. 5, May 1981, and by CAO Ti et al. in an article entitled, "Intermolecular Excimer Interaction In Poly(Polytetramethylene Ether Glycol Aryl Dicarboxylate)" which appeared in *ACTA CHIMICA SINICA*, Vol. 42, No. 1, 1984. Both of the references disclose the use of o-chlorophenol to quench PEN fluorescence in a chloroform solution. Dissolving the PEN in a chloroform solution to disperse the fluorescence quencher therein, however, is not practical on an industrial scale because only very dilute PEN solutions can be prepared. In addition, the PEN must have a low molecular weight to dissolve in the chloroform solution.

In contrast, the present inventors have unexpectedly determined that melt blending a naphthalenedicarboxylic acid containing polymer with 0.1 to 5.0 weight percent of a fluorescence quenching compound selected from a halogen containing aromatic compound, an aromatic ketone and a naphthol compound, provided said fluorescence quenching compound contains an aromatic ring having at least one acyl group, halogen atom or hydroxyl group directly attached to the aromatic ring, significantly reduces the fluorescence of the polyester without deleteriously effecting the physical properties of the polyester.

SUMMARY OF THE INVENTION

Accordingly, it is one object of the present invention to provide naphthalenedicarboxylic acid containing polymer blends with reduced fluorescence.

Accordingly, it is another object of the invention to provide naphthalenedicarboxylic acid containing polymer blends which have reduced fluorescence and are useful in applications where good heat resistance, high glass transition temperature and gas barrier properties are required.

These and other objects are accomplished herein by a process for preparing a naphthalenedicarboxylic acid containing polymer blend which exhibits reduced fluorescence comprising:

(I) melt blending
 (A) 95.0 to 99.9 weight percent of a polyester which comprises
  (1) a dicarboxylic acid component which comprises at least 0.1 mole percent of 2,6-naphthalenedicarboxylic acid or 2,6-naphthalenedicarboxylate esters;
  (2) a diol or diamine component; and
 (B) 0.1 to 5 weight percent of a fluorescence quenching compound selected from the group consisting of a halogen containing aromatic compound, an aromatic ketone and a naphthol compound, provided said fluorescence quenching compound contains an aromatic ring having at least one acyl group, halogen atom or hydroxyl group directly attached to the aromatic ring, wherein the combined weights of (A) and (B) total 100 percent; and
(II) forming the blend into an article.

DESCRIPTION OF THE INVENTION

The polymer blends of the present invention contain naphthalenedicarboxylic acid and a fluorescence quenching compound. The polymers, component (A), contain repeat units from a dicarboxylic acid, a diol or a diamine, and a copolymerizable aromatic ketone. The dicarboxylic acid, component (1), consists of at least 0.1 mole percent 2,6-naphthalenedicarboxylic acid or 2,6-naphthalenedicarboxylate ester. The diol or diamine, component (2), may be any diol or diamine. Preferably, the polymer, component (A), is a polyester containing repeat units from 0.1 to 100 mole percent of 2,6-naphthalenedicarboxylic acid or 2,6-naphthalenedicarboxylate ester, and 0 to 99.9 mole percent of terephthalic acid or dimethyl terephthalate, and at least 90 mole percent ethylene glycol.

The dicarboxylic acid component of the polymer, component (A), may optionally include one or more different monomers other than 2,6-naphthalenedicarboxylic acid, 2,6-naphthalenedicarboxylate ester, terephthalic acid, and dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with 2,6-naphthalenedicarboxylic acid or 2,6-naphthalenedicarboxylate ester are: phthalic acid, isophthalic acid, cyclohexanediacetic acid, diphenyl-4,4'-dicarboxylic acid, succinic acid, glutaric acid, adipic acid, fumaric acid, azelaic acid, sebacic acid, 2,7-naphthalenedicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, trans-4,4'-stilbenedicarboxylic acid, and the like. It should be understood that use of the corresponding acid anhydrides, esters, and acid chlorides of these acids is included in the term "dicarboxylic acid". The polyester may be prepared from one or more of the above dicarboxylic acids or esters.

Component (2) of the present invention is a diol or diamine. Suitable diols include cycloaliphatic diols preferably having 6 to 20 carbon atoms or aliphatic diols preferably having 3 to 20 carbon atoms. Specific examples of diols are: ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

The polymer, component (A), may also contain small amounts of trifunctional or tetrafunctional comonomers such as trimellitic anhydride, trimethylolpropane, pyromellitic dianhydride, pentaerythritol, and other polyester forming polyacids or diols generally known in the art.

Naphthalenedicarboxylic acid containing polyamides can be formed from adipic acid, isophthalic acid, terephthalic acid, 1,3- or 1,4-cyclohexanedicarboxylic acid, aliphatic diacids containing 6 to 12 carbon atoms, aliphatic amino acids or lactams with 6 to 12 carbon atoms, 1,6-hexanediamine, meta- or para-xylylenediamine, 1,3- or 1,4-cyclohexane(bis)methylamine, aliphatic diamines with 4 to 12 carbon atoms, and other polyamide forming diacids and diamines. The polymer, component (A), may be prepared from one or more of the above diols or diamines.

The polymer, component (A), may also contain polycarbonate repeat units formed from the reaction of a carbonic acid derivative with a diol such as bisphenol A. The polymer, component (A), may be a blend of the above-described polyesters, polyamides, polycarbonates, or polyesteramides.

The naphthalenedicarboxylic acid containing polymer, component (A), is prepared by conventional polycondensation procedures well-known in the art which generally include a combination of melt phase and solid state polymerization. Melt phase describes the molten state of the naphthalenedicarboxylic acid containing polymer during the initial polymerization process. The initial polymerization process includes direct condensation of the naphthalenedicarboxylic acid with the diol or diamine or by ester interchange using naphthalenedicarboxylic ester. For example, dimethyl-2,6-naphthalenedicarboxylate is ester interchanged with ethylene glycol at elevated temperatures in the presence of the copolymerizable aromatic ketone and a catalyst. The melt phase is concluded by extruding the naphthalenedicarboxylic acid polymer into strands and pelletizing. Optionally, the copolymerizable aromatic ketone can be melt blended with the naphthalenedicarboxylic acid containing polymer.

The naphthalenedicarboxylic acid containing polymer may optionally be solid state polymerized. Solid state polymerization involves heating the polymer pellets to a temperature in excess of 200° C. but well below the crystalline melt point, either in the presence of an inert gas stream or in a vacuum to remove a diol. Several hours are generally required in the solid state polymerized unit to build the molecular weight.

Typical catalysts which may be used include titanium alkoxides, dibutyl tin dilaurate, combinations of zinc, manganese, or magnesium acetates or benzoates with antimony oxide or antimony triacetate.

The inherent viscosity of the naphthalenedicarboxylic acid containing polymer should be 0.3 to 1.5 dL/g. However, inherent viscosities of from 0.5 to 0.9 are preferred, as measured at 25° C. using 0.50 grams of polymer per 100 ml of a solvent consisting of 60% by weight phenol and 40% by weight tetrachloroethane.

Component (B) of the present invention is 0.1 to 5 weight percent of a fluorescence quenching compound. Preferably, the range of the fluorescence quenching compound is 0.3 to 2.5 weight percent of the blend. Using more than 5 weight percent of the fluorescence quenching compound deleteriously effects the physical properties such as tensile strength, flexural modulus, elongation percent, weather resistance and heat deflection of the naphthalenedicarboxylic acid containing polymer.

The fluorescence quenching compounds useful in the present invention are halogen containing aromatic compounds, aromatic ketones and naphthol compounds. Preferably, the fluorescence quenching compounds do not impart color to the naphthalenedicarboxylic acid containing polymer when blended. The fluorescence quenching compounds contain an aromatic ring selected from benzene, naphthalene, biphenyl and anthracene. The aromatic ring of the fluorescence quenching compound contains at least one acyl group, halogen atom, and/or hydroxyl group directly attached to the aromatic ring. The acyl group has the structure

wherein $R_4$ is selected from unsubstituted and substituted $C_1$–$C_{10}$ alkyl, unsubstituted and substituted phenyl, and unsubstituted and substituted naphthyl groups. $C_1$–$C_{10}$ unsubstituted and substituted alkyl groups represented by $R_4$ include straight or branched chain fully saturated hydrocarbon radicals and these substituted with one or more of the following: $C_5$–$C_7$ cycloalkyl, and $C_5$–$C_7$ cycloalkyl substituted with one or two of $C_1$–$C_6$ alkyl, $C_1$–$C_6$ alkoxy or halogen. The substituted phenyl groups mentioned above, unless otherwise specified, represent such phenyl groups substituted by one or two of $C_1$–$C_6$ alkyl. The alkyl, phenyl and naphthyl groups of $R_4$ may contain any substituent thereon as long as such substituents do not deleteriously effect the fluorescence quenching of the copolymerized aromatic ketone. Examples of acyl groups include acetyl, benzoyl, 1- or 2-naphthoyl, and propionyl. Preferred acyl groups are benzoyl and 1- or 2-naphthoyl. The most preferred acyl group is the benzoyl group ($C_6H_5CO$—).

In addition to the acyl group or in place of the acyl group, the aromatic ring contains at least one halogen atom or hydroxyl group. The halogen atom is selected from bromine, chlorine, or iodine, provided that chlorine is not used alone unless an acyl group, as discussed above, is present. While not wishing to be bound by any particular mechanism or theory, the present inventors believe that the large atomic weights of bromine and iodine enhance intersystem crossing while the atomic weight of chlorine is too low to effectively function by this quenching mechanism. The halogen atoms can be attached to any of the unsubstituted positions on the aromatic rings. Preferred halogen atoms are iodine and bromine.

Optionally, polymerizable groups such as carboxylic esters and/or aliphatic hydroxyl groups may be attached to the aromatic ring. The carboxylic ester has the formula:

wherein $R_3$ is selected from a substituted and unsubstituted $C_1$–$C_6$ alkyl group and a substituted and unsubstituted phenyl group. $C_1$–$C_6$ unsubstituted and substituted alkyl groups represented by $R_3$ include straight or branched chain fully saturated hydrocarbon radicals and these substituted with one or more of the following: $C_5$–$C_7$ cycloalkyl, and $C_5$–$C_7$ cycloalkyl substituted with one or two of $C_1$–$C_6$ alkyl, $C_1$–$C_6$ alkoxy or halogen. The substituted phenyl groups represent such phenyl groups substituted by one or two of $C_1$–$C_6$ alkyl. Preferably $R_3$ is methyl.

The aliphatic hydroxyl group has the formula: $(CH_2)_nOH$ wherein n is an integer from 1 to 6, preferably n is 2. Examples of aromatic ring compounds containing carboxylic esters and/or aliphatic hydroxyl groups are terephthalic acid, isophthalic acid, and 2,6-naphthalenedicarboxylic acid. The fluorescence quenching compounds containing carboxylic esters and/or aliphatic hydroxyl groups can potentially react with the naphthalenedicarboxylic acid containing polymer chain in the melt at high temperatures but chemical reaction is not essential for the purpose of this invention and a mere physical blend produces the desired result. However, fluorescence quenching compounds with high boiling points are desirable in order to minimize losses of the active compounds during processing or molding of the naphthalenedicarboxylic acid containing polymer.

Examples of fluorescence quenching compounds to be melt blended with the naphthalenedicarboxylic acid containing polymer include:

Dimethyl 1-benzoyl 2,6-naphthalenedicarboxylate
Dimethyl 3-benzoyl 2,6-naphthalenedicarboxylate
Dimethyl 4-benzoyl 2,6-naphthalenedicarboxylate
Dimethyl dibenzoyl 2,6-naphthalenedicarboxylate
Dimethyl 1-bromo 2,6-naphthalenedicarboxylate
Dimethyl 3-bromo 2,6-naphthalenedicarboxylate
Dimethyl 4-bromo 2,6-naphthalenedicarboxylate
Dimethyl 1-(2-naphthoyl) 2,6-naphthalenedicarboxylate
Dimethyl 1-(1-naphthoyl) 2,6-naphthalenedicarboxylate
Dimethyl 1-iodo 2,6-naphthalenedicarboxylate
Dimethyl 3-iodo 2,6-naphthalenedicarboxylate
Dimethyl 4-iodo 2,6-naphthalenedicarboxylate
Dimethyl benzoylterephthalate
Dimethyl benzoylisophthalate
Dimethyl iodoterephthalate
Dimethyl 2,3-dibromoterephthalate
Dimethyl 2,5-dibromoterephthalate
Dimethyl tribromoterephthalate
Dimethyl tetrabromoterephthalate
Dimethyl 2-bromo-5-chloroterephthalate
Dimethyl 2-bromo-6-chloroterephthalate
Dimethyl 2-bromo-5-iodoterephthalate
Dimethyl 2-bromo-6-iodoterephthalate
Dimethyl 2-benzoyl-5-bromoterephthalate
Dimethyl 2-benzoyl-6-bromoterephthalate
Dimethyl 2-benzoyl-5-iodoterephthalate
Dimethyl 2-benzoyl-6-iodoterephthalate
4-Chloro-1-naphthol
9,10-Dibromoanthracene
2,6-Diiodonaphthalene
1-Naphthol
1,2-Dibenzoylbenzene
2-Benzoylnaphthalene
1-Benzoylnaphthalene
Anthraquinone
Anthraquinone carboxylic acid
Anthraquinone dicarboxylic acid
Methyl anthraquinone carboxylate
Dimethyl anthraquinone dicarboxylate polyhalogenated 2,6- or 2,7-naphthalenedicarboxylic acids or their diesters, and the like compounds.

The fluorescence quenching compound, component (B), can be added with stirring while the molten polymer is protected by an inert atmosphere such as dry nitrogen. Although the naphthalenedicarboxylic acid containing polymer is not very soluble in most common organic solvents, solution blends can be made in certain solvents such as in phenol/tetrachloroethane blends. A preferred method of making the blends involves the melt extrusion of the naphthalenedicarboxylic acid containing polymer and the additives in extrusion equipment such as that available from Brabender and Werner-Pfleiderer.

Many other ingredients can be added to the blends of the present invention to enhance the performance properties of the blends. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, and the like, can be included herein. All of these additives and the use thereof are well known in the art. Any of these compounds can be used so long as they do not hinder the present invention from accomplishing its objects.

The naphthalenedicarboxylic acid containing polymer blends serve as excellent starting materials for the production of moldings of all types. The naphthalenedicarboxylic acid containing polymers may also be blended with other polymers. Specific applications include food packaging such as bottles, trays, lids and films, medical parts, appliance parts, automotive parts, tool housings, recreational and utility parts. The molding compositions of the present invention are especially useful in applications that require transparent molded parts. Additionally, the polymers can be used to prepare extruded sheets for thermoforming applications. The polymers are readily extruded into films or processed into monolayer or multilayer food and beverage containers. Potential methods for producing containers include: (1) injection stretch blow molding using either one or two stage technology, (2) injection blow molding, (3) extrusion blow molding, (4) pipe extrusion, and (5) co-injection or coextrusion where the polymers can serve as either the structural layer or barrier layer depending upon end use requirements. Fibers, melt-blown webs, extruded sheets, vacuum-drawn trays/parts, Injection molded parts, and extrusion coated wires may also be made from these polymers.

The materials and testing procedures used for the results shown herein are as follows:

Fluorescence Intensity was determined using a Perkin-Elmer LS5B Luminescence Spectrometer which measured relative fluorescence intensity at peak maxima.

The composition of the polyesters was determined using H-NMR spectroscopy (JEOL 270 Mhz). Solutions (2.5% weight/volume) in 70/30 $CDCl_3/CF_3COOD$ were scanned 256 times. A delay of 10 seconds was used with a pulse width of 3.4 microseconds (5.0 microseconds, 90°).

Crystallization half-times ($t_{\frac{1}{2}}$) were determined by differential scanning calorimetry (DSC) using a Perkin-Elmer DSC II instrument. The $t_{\frac{1}{2}}$ was determined by the following method: The sample was heated to 300° C. under a nitrogen atmosphere and held for two minutes. The sample was removed from the DSC and immediately cooled to −20° C. The DSC was cooled to 50° C. and the sample was returned to the DSC. The temperature of the DSC was increased at a rate of 320° C./minute to a test temperature of 190° C., 210° C. or 230° C. Samples were isothermally crystallized at each of the test temperatures. The crystallization half-time ($t_{\frac{1}{2}}$) is the time required to reach the peak on the crystallization exotherm.

Inherent viscosity (I.V.) was measured at 25° C. using 0.50 grams of polymer per 100 ml of a solvent consisting of 60% by weight phenol and 40% by weight tetrachloroethane.

Sample preparation for determining fluorescence intensity involved grinding the polyester samples to 3–4 mm. The samples were micropulverized in an analytical grinding mill and passed through a 120 mesh screen. The powders were dried for 24 hours at 140° C. Approximately 0.5 grams of the powder was packed into a sample holder and measurements were taken by reflectance. The excitation wavelength was 350 nm and the emission maximum was 428–432 nm unless listed otherwise. The values are reported as normalized to poly(ethylene-2,6-naphthalenedicarboxylate) (fluorescence intensity 100). The fluorescence intensity of poly(ethylene-2,6-naphthalenedicarboxylate) was repeated 10 times with a standard deviation of 5.0. Two measurements were taken of all other samples and the averages are reported in Table I.

The blends of the present invention will be further illustrated by a consideration of the following examples, which are intended to be exemplary of the invention. All parts and percentages in the examples are on a weight basis unless otherwise stated.

EXAMPLE 1

Poly(ethylene 2,6-naphthalene dicarboxylate) was prepared by the following procedure.

Dimethyl 2,6-naphthalene dicarboxylate (0.5 moles, 122 grams), ethylene glycol (1.0 moles, 62 grams), and catalyst metals were placed in a 500 mL polymerization reactor under a nitrogen atmosphere. The mixture was heated with stirring at 200° C. for 2 hours. The temperature was increased to 220° C. and maintained for 1 hour. The temperature was increased to 290° C. which took approximately 20 minutes. When the temperature reached 290° C., the nitrogen flow was stopped and vacuum was applied. The polymer was stirred under vacuum (0.1–0.3 mm Hg) for 50 minutes. The polymer was cooled and ground. The PEN had an I.V. of 0.55 dL/g. The fluorescence intensity of the polymer is listed in Table I.

EXAMPLE 2

Melt blending of dimethyl benzoylterephthalate with PEN.

PEN polymer pellets, 500 grams, prepared in Example 1 were dried for 12 hours at 160° C. in desiccant air with a dew point ≦ −29° C. and placed in a plastic bag. Dimethyl benzoylterephthalate powder, 5 grams, (1 wt %) was added to the plastic bag. The dimethyl benzoylterephthalate and PEN were dry blended by shaking the plastic bag.

Dry PEN polymer was flushed through a Brabender single screw extruder to purge the extruder. The dry blend PEN/dimethyl benzoylterephthalate was passed through the extruder with the three heated zones maintained at 270° C., 290° C., and 290° C. The melt blended sample was extruded into a rod, cooled in water, and chopped into ⅛ inch pellets. The pellets were crystallized in an air oven at 225° C. for 45 minutes and then ground into powder in order to determine the fluorescence intensity. The fluorescence intensity of the blend is listed in Table I.

EXAMPLE 3

Melt blending of dimethyl iodoterephthalate with PEN.

Dimethyl iodoterephthalate, 5.0 grams, (1 wt %) was melt blended with the PEN prepared in Example 1 by the procedure set forth in Example 2. The fluorescence intensity of the blend is listed in Table I.

EXAMPLE 4

Melt blending of 4-chloro-1-naphthol with PEN.

4-chloro-1-naphthol, 5.0 grams, (1 wt %) was melt blended with the PEN prepared in Example 1 by the procedure set forth in Example 2. The fluorescence intensity of the blend is listed in Table I.

EXAMPLE 5

Melt blending of 9,10-dibromoanthracene with PEN.

9,10-Dibromoanthracene, 5.0 grams, (1 wt %) was melt blended with the PEN prepared in Example 1 by the procedure set forth in Example 2. The fluorescence intensity of the blend is listed in Table I.

EXAMPLE 6

Melt blending of 2,6-diiodonaphthalene with PEN.

2,6-Diiodonaphthalene, 5.0 grams, (1 wt %) was melt blended with the PEN prepared in Example 1 by the procedure set forth in Example 2. The fluorescence intensity of the blend is listed in Table I.

EXAMPLE 7

Melt blending of dimethyl iodoterephthalate with PEN.

Dimethyl iodoterephthalate, 10 grams, (2 wt %) was melt blended with the PEN prepared in Example 1 by the procedure set forth in Example 2. The fluorescence intensity of the blend is listed in Table I.

EXAMPLE 8

Melt blending of 1-naphthol with PEN.

1-Naphthol, 3.0 grams, (0.6 wt %) was melt blended with the PEN prepared in Example 1 by the procedure set forth in Example 2. The fluorescence intensity of the blend is listed in Table I.

EXAMPLE 9

Melt blending of 1,2-dibenzoylbenzene with PEN.

1,2-Dibenzoylbenzene, 2.9 grams, (0.6 wt %) was melt blended with the PEN prepared in Example 1 by the procedure set forth in Example 2. The fluorescence intensity of the blend is listed in Table I.

EXAMPLE 10

Melt blending of 2-benzoylnaphthalene with PEN.

2-Benzoylnaphthalene, 2.4 grams, (0.5 wt %) was melt blended with the PEN prepared in Example 1 by the procedure set forth in Example 2. The fluorescence intensity of the blend is listed in Table I.

EXAMPLE 11

Melt blending of dimethyl 1-benzoyl-2,6-naphthalene dicarboxylate with PEN.

Dimethyl 1-benzoyl-2,6-naphthalene dicarboxylate, 5.0 grams, (1 wt %) is melt blended with the PEN prepared in Example 1 by the procedure set forth in Example 2. The fluorescence intensity of the blend is listed in Table I.

EXAMPLE 12

Melt blending of dimethyl 1-benzoyl-2,6-naphthalene dicarboxylate with PEN.

Dimethyl 1-benzoyl-2,6-naphthalene dicarboxylate, 10 grams, (2 wt %) is melt blended with the PEN prepared in Example 1 by the procedure set forth in Example 2. The fluorescence intensity of the blend is listed in Table I.

EXAMPLE 13

Melt blending of dimethyl 1-benzoyl-2,6-naphthalene dicarboxylate with PEN.

Dimethyl 1-benzoyl-2,6-naphthalene dicarboxylate, 25 grams, (5wt %) is melt blended with the PEN prepared in Example 1 by the procedure set forth in Example 2. The fluorescence intensity of the blend is listed in Table I.

EXAMPLE 14

Melt blending of dimethyl 1-(2-naphthoyl)-2,6-naphthalene dicarboxylate with PEN.

Dimethyl 1-(2-naphthoyl)-2,6-naphthalene dicarboxylate, 5.0 grams, (1 wt %) is melt blended with the PEN prepared in Example 1 by the procedure set forth in Example 2. The fluorescence intensity of the blend is listed in Table I.

TABLE I

| EX. | FLUORESCENSE QUENCHER (type) | (wt %) | FLUORESCENCE INTENSITY (at 430 nm) |
|---|---|---|---|
| 1 | PEN control | — | 100 |
| 2 | dimethyl benzoyl-terephthalate | 1.0 | 71 |
| 3 | dimethyl iodoterephthalate | 1.0 | 83 |
| 4 | 4-chloro-1-naphthol | 1.0 | 33 |
| 5 | 9,10-dibromoanthracene | 1.0 | 20 |
| 6 | 2,6-diiodonaphthalene | 1.0 | 77 |
| 7 | dimethyl iodoterephthalate | 2.0 | 78 |
| 8 | 1-naphthol | 0.6 | 57 |
| 9 | 1,2-dibenzoylbenzene | 0.6 | 68 |
| 10 | 2-benzoylnaphthalene | 0.5 | 57 |
| 11 | dimethyl 1-benzoyl-2,6-naphthalene dicarboxylate | 1.0 | 45–55 |
| 12 | dimethyl 1-benzoyl-2,6-naphthalene dicarboxylate | 2.0 | 30–40 |
| 13 | dimethyl 1-benzoyl-2,6-naphthalene dicarboxylate | 5.0 | 20–30 |
| 14 | dimethyl 1-(2-naphthoyl)-2,6-naphthalene dicarboxylate | 1.0 | 40–50 |

The results in Table I clearly indicate that the poly(ethylene-2,6-naphthalene dicarboxylate) blends containing a critical range of a fluorescence quenching compound selected from a halogen containing aromatic compound, an aromatic ketone or a naphthol compound, which is melt blended with the PEN, exhibit significantly less fluorescence than PEN compositions without the fluorescence quencher. The use of the fluorescence quencher in a critical amount does not deleteriously effect the physical properties of the blends.

EXAMPLE 15

Poly(ethylene terephthalate) containing 5 mole percent copolymerized dimethyl 2,6-naphthalenedicarboxylate was prepared by the following procedure.

Dimethyl terephthalate (0.713 mol, 138.2 g), dimethyl 2,6-naphthalenedicarboxylate (0.0375 mol, 9.15 g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 30 minutes. The polymer was cooled and ground. The polymer had 0.43 dL/g I.V. Fluorescence data are summarized in Table II.

EXAMPLE 16

Melt blending of poly(ethylene terephthalate) containing 5 mole percent copolymerized dimethyl 2,6-naphthalenedicarboxylate with dimethyl 1-benzoyl-2,6-naphthalenedicarboxylate.

Dimethyl 1-benzoyl-2,6-naphthalenedicarboxylate, 5.0 grams, (1 wt %) is melt blended with 500 grams of poly(ethylene terephthalate)/poly(ethylene-2,6-naphthalenedicarboxylate) copolymer prepared in Example 15 by the melt blending procedure set forth in Example 2. The fluorescence data are summarized in Table II.

EXAMPLE 17

Poly(ethylene terephthalate) containing 25 mole percent copolymerized dimethyl 2,6-naphthalenedicarboxylate was prepared by the following procedure.

Dimethyl terephthalate (0.563 mol, 109.1 g), dimethyl 2,6-naphthalenedicarboxylate (0.187 mol, 45.7 g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 24 minutes. The polymer was cooled and ground. The polymer had 0.36 dL/g I.V. Fluorescence data are summarized in Table II.

EXAMPLE 18

Melt blending of poly(ethylene terephthalate) containing 25 mole percent copolymerized dimethyl 2,6-naphthalenedicarboxylate with dimethyl iodoterephthalate.

Dimethyl iodoterephthalate, 5.0 grams, (1 wt %) is melt blended with 500 grams of poly(ethylene terephthalate)/poly(ethylene-2,6-naphthalenedicarboxylate) copolymer prepared in Example 17 by the melt blending procedure set forth in Example 2. The fluorescence data are summarized in Table II.

EXAMPLE 19

Poly(butylene 2,6-naphthalenedicarboxylate) containing 30 mole percent copolymerized 1,4-cyclohexanedimethanol was prepared by the following procedure.

Dimethyl 2,6-naphthalenedicarboxylate (0.5 mol, 122.0 g), 1,4-butanediol (0.7 mol, 63.0 g), 1,4-cyclohexanedimethanol (0.15 mol, 21.6 g) and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 260° C., the nitrogen flow was stopped and vacuum was applied. The polymer was stirred under vacuum (0.3–0.5 mm Hg) for 8 minutes. The polymer was cooled and ground. The polymer had 0.41 dL/g I.V. Fluorescence data are summarized in Table II.

EXAMPLE 20

Melt blending of poly(butylene 2,6-naphthalenedicarboxylate) containing 30 mole percent copolymerized 1,4-cyclohexanedimethanol with 1-chloro-4-naphthol.

1-Chloro-4-naphthol, 5.0 grams, (1 wt %) is melt blended with 500 grams of the copolymer prepared in Example 19 by the melt blending procedure set forth in Example 2. The fluorescence data are summarized in Table II.

EXAMPLE 21

Poly(butylene 2,6-naphthalenedicarboxylate) was prepared by the following procedure.

Dimethyl 2,6-naphthalenedicarboxylate (0.5 mol, 122.0 g), 1,4-butanediol (1.0 mol, 90.1 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 5 minutes. The polymer was cooled and ground. The polymer had 0.62 dL/g I.V. Fluorescence data are summarized in Table II.

EXAMPLE 22

Poly(ethylene 2,6-naphthalenedicarboxylate) containing 25 mole percent copolymerized dimethyl terephthalate was prepared by the following procedure.

Dimethyl 2,6-naphthalenedicarboxylate (0.563 mol, 137.3 g), dimethyl terephthalate (0.187 mol, 36.4 g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 25 minutes. The polymer was cooled and ground. The polymer had 0.38 dL/g I.V. Fluorescence data are summarized in Table II.

EXAMPLE 23

Poly(ethylene 2,6-naphthalenedicarboxylate) containing 50 mole percent copolymerized dimethyl terephthalate was prepared by the following procedure.

Dimethyl 2,6-naphthalenedicarboxylate (0.375 mol, 91.5 g), dimethyl terephthalate (0.375 mol, 72.7g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 30 minutes. The polymer was cooled and ground. The polymer had 0.39 dL/g I.V. Fluorescence data are summarized in Table II.

EXAMPLE 24

Poly(ethylene terephthalate) was prepared by the following procedure.

Dimethyl terephthalate (0.75 mol, 145.5 g), ethylene glycol (1.5 mol, 93.0 g), and catalyst metals were placed in a 0.5 L polymerization reactor under a nitrogen atmosphere. The mixture was heated with stirring at 200° C. for 60 min. The temperature was increased to 215° C. and maintained for 60 min. The temperature was increased to 285° C., the nitrogen flow was stopped and vacuum was applied. The polymer was stirred under vacuum (0.3–0.5 mm Hg) for 30 minutes. The polymer was cooled and ground. The polymer had 0.35 dL/g I.V. Fluorescence data are summarized in Table II.

EXAMPLE 25

Poly(ethylene terephthalate) containing 1 mole percent copolymerized dimethyl 2,6-naphthalenedicarboxylate was prepared by the following procedure.

Dimethyl terephthalate (0.743 mol, 144.1 g), dimethyl 2,6-naphthalenedicarboxylate (0.0075 mol, 1.83), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 40 minutes. The polymer was cooled and ground. The polymer had an I.V. of 0.51 dL/g. Fluorescence data are summarized in Table II.

TABLE II

| EX. | Polymer Composition | Fluorescence Quencher (wt %) | Relative Fluorescence Intensity | Maximum Wavelength (nm) |
|---|---|---|---|---|
| 15 | PET + 5% DMN | None | 181 | 383 |
| 16 | PET + 5% DMN | 1% BzN | 40–60 | 385 |
| 17 | PET + 25% DMN | None | 85 | 418 |
| 18 | PET + 25% DMN | 1% Iodo-DMT | 65–75 | 419 |
| 19 | PBN + 30% CHDM | None | 64 | 421 |
| 20 | PBN + 30% CHDM | 1% 4-CN | 30–40 | 431 |
| 21 | PBN | None | 74 | 428 |
| 22 | PEN + 25% DMT | None | 110 | 429 |
| 23 | PEN + 50% DMT | None | 102 | 431 |
| 24 | PET | None | 21 | 388 |
| 25 | PET + 1% DMN | None | 241 | 380 |

DMN = dimethyl 2,6-naphthalenedicarboxylate
BzN = dimethyl 1-benzoyl-2,6-naphthalenedicarboxylate
PBN = poly(butylene 2,6-naphthalenedicarboxylate)
CHDM = 1,4-cyclohexanedimethanol
PET = poly(ethylene terephthalate)
Iodo-DMT = dimethyl iodoterephthalate
4-CN = 4-chloro-1-naphthol The results in Table II clearly indicate that naphthalenedicarboxylic acid containing polymers have a significant fluorescence intensity even when naphthalenedicarboxylic acid is a minor component. Unexpectedly, PET copolymerized with as little as 1 mole percent naphthalenedicarboxylic acid has a greater fluorescence intensity than PEN homopolymer. The results also indicate that blending in the fluorescence quenchers of this invention effectively reduce fluorescence intensity in a broad composition range of naphthalenedicarboxylic acid containing polymers.

Many variations will suggest themselves to those skilled in this art in light of the above detailed description. All such obvious modifications are within the full intended scope of the appended claims.

What is claimed is:

1. A process for preparing a poly(ethylene 2,6-naphthalene dicarboxylate) blend which exhibits reduced fluorescence comprising:
(I) melt blending
   (A) 95.0 to 99.9 weight percent of a polyester which comprises
   (1) a dicarboxylic acid component comprising repeat units from 0.1 to less than 85 mole percent of a dicarboxylic acid selected from the group consisting of naphthalene-2,6-dicarboxylic acid, and naphthalene-2,6-dicarboxylate ester;
   (2) a diol component comprising repeat units from at least 85 mole percent ethylene glycol, based on 100 mole percent dicarboxylic acid and 100 mole percent diol; and
   (B) 0.1 to 5.0 weight percent of a fluorescence quenching compound selected from the group consisting of an aromatic ketone and a naphthol compound, provided said fluorescence quenching compound contains an aromatic ring having at least one acyl group or hydroxyl group directly attached to the aromatic ring, wherein the combined weights of (A) and (B) total 100 percent; and (II) forming the blend into an article.

2. The process of claim 1 wherein the fluorescence quenching compound contains an aromatic ring selected from the group consisting of benzene, naphthalene, biphenyl and anthracene.

3. The process of claim 1 wherein the acyl group which is directly attached to the aromatic ring has the structure

wherein $R_4$ is selected from the group consisting of $C_1$–$C_{10}$ alkyl, phenyl, and naphthyl groups.

4. The process of claim 3 wherein the acyl group is selected from the group consisting of acetyl, benzoyl, 1- or 2-naphthoyl, and propionyl.

5. The process of claim 1 wherein the fluorescence quenching compound, component (B), is dimethyl benzoylterephthalate.

6. The process of claim 1 wherein the fluorescence quenching compound, component (B), is dimethyl 1-benzoyl-2,6-naphthalene dicarboxylate.

7. The process of claim 1 wherein the fluorescence quenching compound, component (B), is selected from the group consisting of anthraquinone, anthraquinone carboxylic acid, anthraquinone dicarboxylic acid, methyl anthraquinone carboxylate or other anthraquinone carboxylate esters, dimethyl anthraquinone dicarboxylate or other anthraquinone dicarboxylate diesters, and combinations thereof.

* * * * *